April 2, 1946.  L. SLOAN  2,397,700
FLEXIBLE COUPLING
Filed Nov. 26, 1943  2 Sheets-Sheet 1

INVENTOR.
Lon Sloan
BY
Hull &West
ATTORNEYS

April 2, 1946.   L. SLOAN   2,397,700
FLEXIBLE COUPLING
Filed Nov. 26, 1943   2 Sheets-Sheet 2

INVENTOR.
Lon Sloan
BY Hull & West
ATTORNEYS

Patented Apr. 2, 1946

2,397,700

UNITED STATES PATENT OFFICE 2,397,700

FLEXIBLE COUPLING

Lon Sloan, Cleveland, Ohio

Application November 26, 1943, Serial No. 511,766

6 Claims. (Cl. 64—15)

The present invention, like that which constitutes the subject matter of Patent 2,196,841, granted to me April 9, 1940, relates to flexible couplings; and the constructions disclosed in said patent are the nearest to my present improvements of any prior art of which I have knowledge.

As is known to those familiar with the subject, flexible couplings serve as torque transmitting connections between driving and driven members or shafts, and yield to any angular or offset parallel misalignment, or a combination of angular and offset misalignment, between said members or shafts.

Among the objects of my present invention are to simplify the construction, reduce the manufacturing cost, and facilitate the assembly of couplings of the kind in question, while maintaining the highest torque transmitting efficiency and providing ample capacity for any misalignment, as well as for any radial and axial vibration, encountered in practice.

Further objects are to provide a flexible coupling wherein practically perfect dynamic balance is obtained; and to provide a coupling of the class referred to that is very durable; that is practically immune from disorder; that requires no lubrication, and that demands no attention after being properly installed.

A further and more specific object of the invention is the provision of a flexible coupling comprising end members for rigid connection with the driving and driven members, respectively; a flexible torque transmitting element in the nature of a spiral spring surrounding and substantially concentric with the axes of said end members and through which they have a yielding driving connection permitting limited relative movement between them in all directions, and means exterior of said flexible element by which a delayed positive drive is effected between said end members upon a predetermined torsional deflection of said element.

Figure 1:
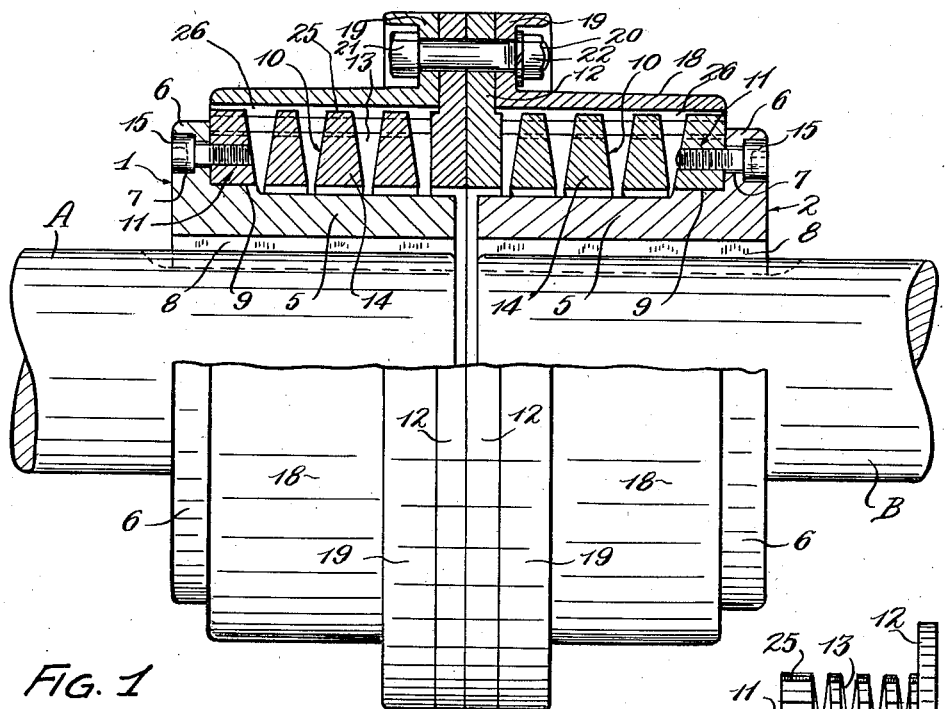
Figure 2:
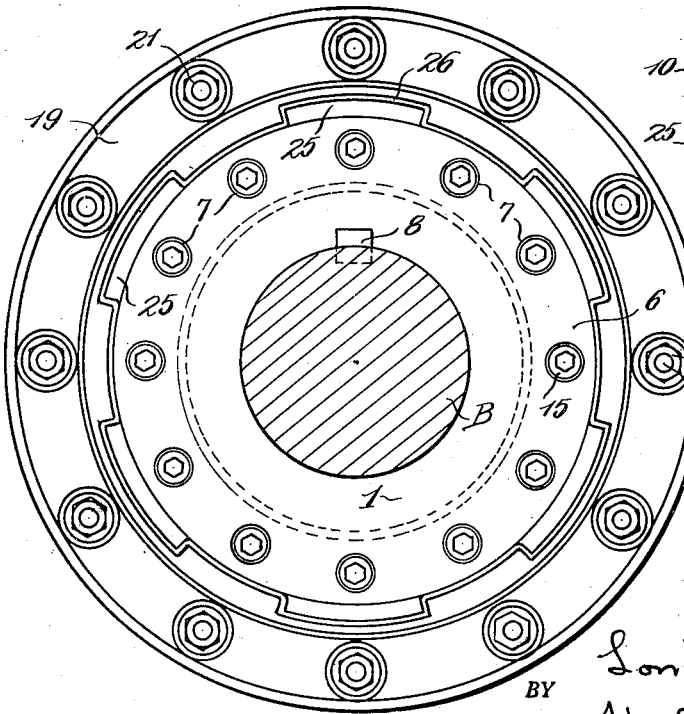
Figure 3:
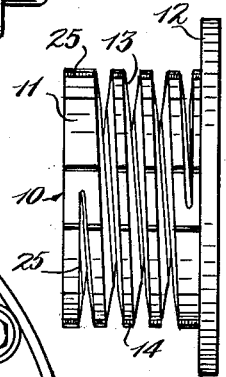
Figure 4:
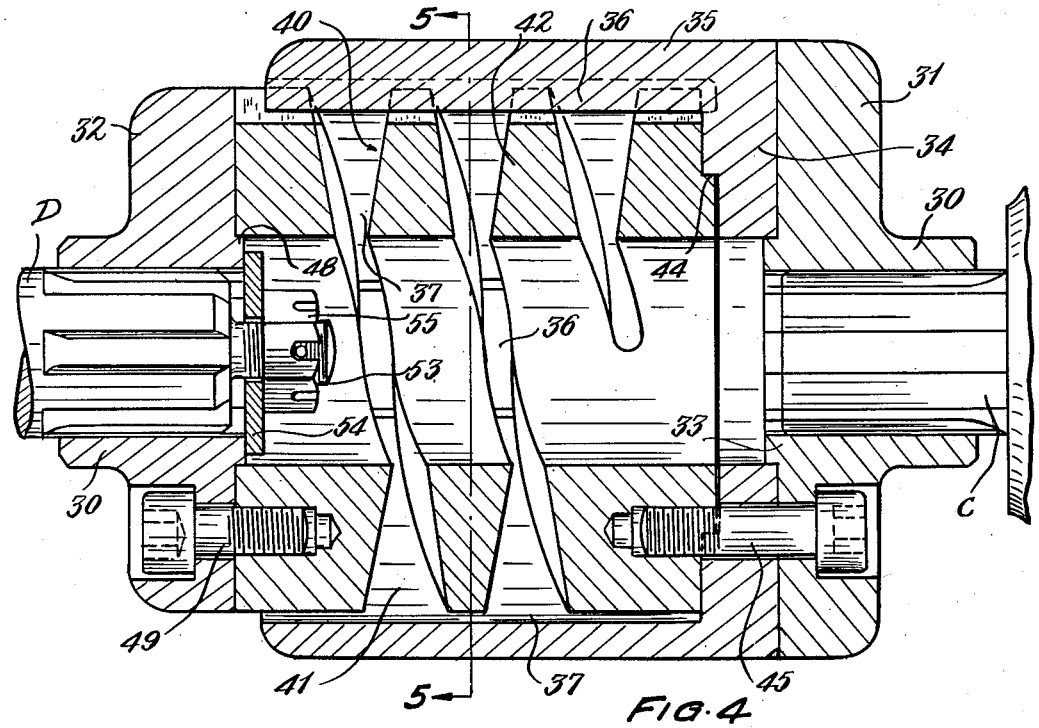
Figure 5:
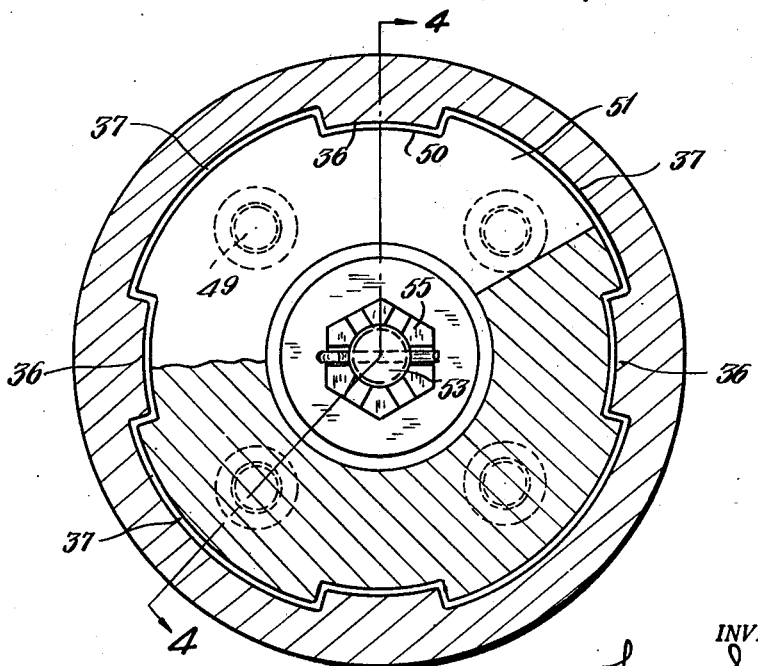

Other objects and advantages will appear as I proceed to describe the invention by reference to the accompanying drawings wherein Fig. 1 is a side elevational view, partly in section, of a flexible coupling embodying the invention, this construction being especially suited to large size couplings and being adapted to abutting shaft installations; Fig. 2 is an end elevation of the coupling, the shaft appearing in said view being in section; Fig. 3 is a side elevation, on a smaller scale, of one of the flexible elements or springs; Fig. 4 is a longitudinal section, on the line 4—4 of Fig. 5 (with the sectioned areas disposed in a common plane), through a modified form of the invention adapted to installations wherein the shafts are spaced a substantial distance apart, the present construction being especially appropriate for small size couplings, and Fig. 5 is a section on the line 5—5 of Fig. 4.

In the construction illustrated in Figs. 1 to 3, end members, designated generally by the reference numerals 1 and 2, are applied to the adjacent ends of shafts A and B, either of which may be regarded the driving member, and the other the driven member. The end members 1 and 2 are desirably identical, and each comprises a cylindrical hub 5 and an end flange 6, the latter being provided with a series of counterbored holes 7. The hubs 5 have bores that fit the shafts A and B to which the hubs are secured against rotation by keys 8. The external diameter of each of the hubs 5 is enlarged adjacent the flange 6 to provide a cylindrical seat 9.

Surrounding each hub 5 is a flexible torque transmitting element 10, shown in side elevation on a reduced scale in Fig. 3.

Each of the torque transmitting elements desirably consists of a casting, forging or the like, and, in accordance with the method described and claimed in an application filed by myself concurrently herewith, is produced from an inherently resilient material such, for example, as some of the alloy cast irons that are now being extensively produced and which possess physical properties comparable to those of forged steel and commercial bar stock—one especially suitable for the purpose being known to the trade as "Meehanite."

Each element 10 comprises a hollow cylindrical body portion 11 and an end flange 12, said body being surrounded by a spiral slot 13 whose terminals are disposed on the same side of the body in alignment longitudinally thereof. This insures perfect dynamic balance of the element, assuming the same to be absolutely symmetrical about its longitudinal axis. The slot 13 reduces the portion of the body 11 intermediate its extreme ends to a flexible helix 14, remembering that the element is formed from inherently resilient material. The end of the body remote from the flange 12 fits snugly within the angle between the cylindrical seat 9 and the inner surface of the flange 6 of the end member wherewith the element is associated. Said end of the body 11 is provided with tapped holes that register with the previously mentioned holes 7 of the flange 6; and screws 15, that are projected through the holes 7 and are screwed into those of the body, secure the torque transmitting element 10 to the corresponding end member.

The two torque transmitting elements 10 may be identical in form, and reversed with respect to each other, or the helixes 14 of said elements may be of opposite pitch so that in the action of the coupling, as will hereinafter more fully appear, one helix will expand as the other contracts.

The opposed torque transmitting elements are arranged with their end flanges 12 in contact with each other, and surrounding the bodies 11 of said elements, are cylindrical casings 18 provided with flanged end walls 19 that bear against the flanges 12. Said end walls and flanges 12 have registering holes through which bolts 20 are projected, the heads 21 of which, and the nuts 22 that are applied to their threaded ends, are virtually enclosed by the peripheral flanges of the walls 19.

The bodies 11 of the torque transmitting elements 10 are provided with longitudinal peripheral splines 25 that normally repose substantially centrally within similarly disposed grooves 26 of the casings 18, the lateral edges of the splines 25 being spaced an appreciable distance from the side walls of the grooves 26; and throughout their opposed cylindrical surfaces, the torque transmitting elements and casings are spaced apart a sufficient distance to allow the lateral or radial play requisite to a proper action of the coupling.

I may cite as an example of the many uses of flexible couplings the connection between the shaft of a Diesel engine and that of a compressor, plunger pump or other unit driven by the engine. Regardless of the care exercised in setting up the equipment, misalignment between the driving and driven members of shafts almost invariably initially exists or ultimately develops. Accordingly, provision has to be made for such a contingency in every case where the machinery is of substantial size and form. It will be apparent from its construction that the flexible coupling above described will readily yield to angular and/or offset misalignment between the driving and driven members represented by the shafts A and B, as well as to any axial or radial vibration of the members or shafts, the flexible elements actually having the capacity for misalignment and vibration far in excess of any practical demand, wherefore, in practice, flexing of the elements to compensate for irregularities in the action of the driving and driven members is confined to the initial stage of distortion wherein opposition to such action is at the minimum.

It is also apparent from the nature of the construction that the helixes 14 are stiff and capable of transmitting the full torque load without appreciable torsional deflection excepting at the moment of starting or stopping, when any shocks that would otherwise occur between the connected shafts or members will be absorbed by the helixes as stored up energy to be subsequently released. When momentary differences do occur in the relative speeds of the driving and driven members or shafts, as when starting or stopping, the helixes are protected against undue distortion and overload by engagement of the splines 25 of the power transmitting elements with the abutments provided by the side walls of the grooves 26 of the casings 18. These coacting parts provide a delayed action positive driving connection between the driving and driven members upon predetermined torsional deflection of the helixes.

Attention is also directed to the fact that the casings 18 are yieldingly suspended by the torque transmitting elements 10. Consequently, at high speeds, a gyroscopic action will be set up that will tend to keep the exterior of the coupling in a substantially constant position notwithstanding slight variations in the positions of the end members due to misalignment.

In the embodiment of the invention illustrated in Figs. 4 and 5, a single power transmitting element is employed; and, incidentally, the end members are designed for attachment to driving or driven members or shafts that are spaced a considerable distance apart.

The driving and driven members are designated C and D, and to them are splined the hubs 30 of the flange-like end members 31 and 32. Engaged with the inner face of the end member 31, and centered thereon by a shallow cylindrical boss 33, is the annular end wall 34 of a cylindrical casing 35, formed on its inner side with alternate longitudinal splines 36 and relatively wide grooves 37. Occupying the casing 35, with its periphery suitably spaced from the inner surface of the casing is the hollow cylindrical power transmitting element 40 having a spiral slot 41 that terminates short of the ends of the element and reduces the portion of the element intermediate said ends to a helix 42. The element, being produced from inherently resilient material, as were the corresponding elements in the embodiment of the invention above described, the helix 42 is flexible. The rigid end of the helix adjacent the end wall 34 of the casing is provided with a shallow cylindrical boss 44 that fits into a correspondingly shaped depression made in the end wall 34, and screws 45 are projected through registering holes in the end member 31 and the end wall 34 and are threaded into tapped holes in the end of the element 42, the heads of said screws occupying counterbores in the outer face of the end member 31. The opposite end of the power transmitting element is engaged with the inner face of the end member 32 and is centered thereon by a shallow cylindrical boss 48 that fits within the bore of the element 40. The end member 32 is connected to the adjacent end of said element by screws 49 that are projected through counterbored holes in the end member and are threaded into tapped holes in the power transmitting element. The periphery of the power transmitting element is made up of alternate longitudinal grooves 50 and relatively broader splines 51, the former loosely receiving the splines 36 of the casing, while the splines 51 occupy the grooves 37 with their lateral edges normally spaced an appreciable distance from the side walls of said grooves.

The end of the shaft D is shown as provided with a threaded axial stud 53 that is extended through a washer 54 which bears, adjacent its edge, against the boss 48 of the end member 32, and by means of a nut 55 that is threaded onto the stud 53, the end of the shaft D may be drawn firmly into the hub of the end member 32.

It is obvious from the construction above described that the helix 42 will yield to any angular or offset misalignment between the driving and driven members and also to any radial or axial vibration. In the case of momentary differences in the speeds of the driving and driven members, energy will be stored in the helix, subsequently to be spent in the form of transmitted power. Upon a predetermined degree of torsional deflection of the helix resulting from such differences in speed, the interengaging splines of the casing 35 and the torque transmitting element 40 will coact to establish a positive driving connection between the end members of the coupling, thereby to relieve the helix 42 of undue strain and distortion.

An advantage arising from the separable connection between the opposite ends of the power transmitting element and the end members of the coupling is that different end members may be selected for incorporation in a coupling according to whether the shafts are arranged in abutting relation, as in Fig. 1, or in spaced relation, as in Fig. 4. Also, end members having different size bores may be selected according to the size of the shafts wherewith the coupling is to be employed.

Having thus described my invention, what I claim is:

1. A flexible coupling comprising end members for attachment to a driving member and a driven member, respectively, said end members being spaced apart along the axis of the coupling, a hollow cylindrical torque transmitting element surrounding said axis and disposed between said end members, means connecting one of the end members to the adjacent end of said element, a casing surrounding said element and including a part interposed between the opposite end of said element and the other end member, means securing the last mentioned end member and said part to the adjacent end of the element, the portion of said element intermediate its ends being flexible, and splines on the exterior of said element and the interior of said casing arranged for engagement with each other but normally spaced apart a substantial distance.

2. A flexible coupling comprising end members for attachment to a driving member and a driven member, respectively, said end members being spaced apart along the axis of the coupling, a hollow cylindrical torque transmitting element surrounding said axis and disposed between said end members, means connecting one of the end members to the adjacent end of said element, a casing surrounding said element and including a part interposed between the opposite end of said element and the other end member, means securing the last mentioned end member and said part to the adjacent end of the element, the portion of said element intermediate its ends being flexible, said element having longitudinal peripheral grooves and the casing having correspondingly disposed splines on its interior that occupy said grooves with their surfaces normally spaced a substantial distance from the opposed surfaces of the grooves.

3. A flexible coupling comprising end members for attachment to a driving member and a driven member, respectively, said end members being spaced apart along the axis of the coupling, a hollow cylindrical torque transmitting means surrounding said axis and secured at its ends to said end members, the portion of said means intermediate its ends being flexible, and a casing surrounding said means and supported solely thereby, the casing and said means having cooperating parts through which a positive driving connection is established between the end members upon a predetermined degree of torsional deflection of the aforesaid flexible portions.

4. A flexible coupling comprising end members for attachment to a driving member and a driven member, respectively, said end members being spaced apart along the axis of the coupling, two hollow cylindrical torque transmitting elements axially aligned and in substantially concentric relation to the aforesaid axis, said elements having their adjacent ends engaged with each other and their opposite ends secured to the respective end members, the portion of each element intermediate its ends being flexible, casings surrounding said elements and connected together and to said elements in the region of the adjacent engaging ends of the elements, the casing and said elements having splines arranged to contact one another but normally spaced apart for effecting positive driving connections between the end members upon a predetermined degree of torsional deflection of the aforesaid flexible portions of the said elements.

5. A flexible coupling comprising end members for attachment to a driving member and a driven member, respectively, said members being spaced apart along the axis of the coupling, two hollow cylindrical torque transmitting elements arranged in substantially axial alignment with their adjacent ends engaged with each other and in substantially concentric relation to the aforesaid axis, the said adjacent ends being characterized by radially extended flanges, the end members being provided with seats to which are fitted the ends of said elements remote from said flanges, means securing said end members to the adjacent ends of said elements, a cylindrical casing surrounding each element and radially spaced therefrom, each casing having an end wall engaged with the radially extended flange of the corresponding element, means securing together the flanges of said elements and the end walls of the two casings, the elements being provided with longitudinal peripheral grooves and the casings having internal similarly disposed splines that occupy said grooves and from the walls of which the opposed surfaces of said splines are normally spaced a substantial distance.

6. A flexible coupling comprising a structure including end members for attachment to a driving member and a driven member, respectively, said end members being spaced apart along the axis of the coupling, a hollow cylindrical torque transmitting means surrounding said axis and secured at its ends to said end members, the portion of said means intermediate its ends being flexible, and a casing incorporated in the structure and enclosing said means, said casing and the said means having cooperating parts disposed longitudinally of the coupling and extending substantially from one to the other of said end members through which a positive driving connection is established between the end members upon a predetermined degree of torsional deflection of the aforesaid flexible portion.

LON SLOAN.